Nov. 7, 1933.    R. THUN    1,934,514
OPTICAL FILM COPYING MACHINE
Filed Nov. 12, 1930    2 Sheets-Sheet 1
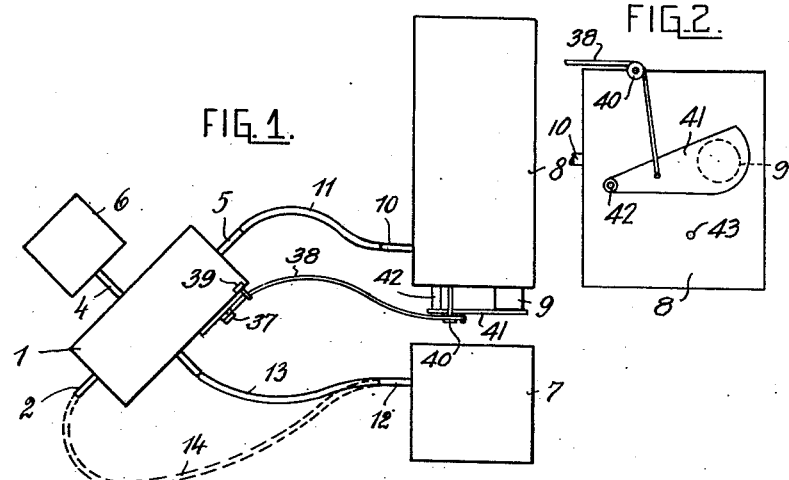
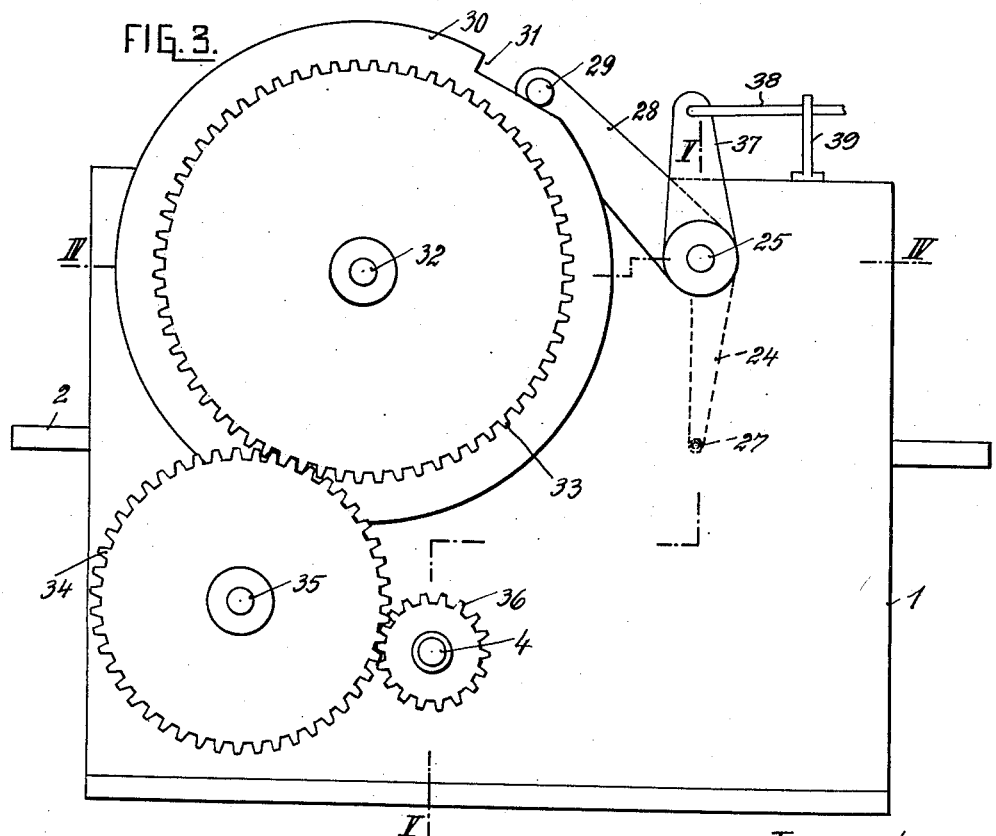
Inventor:
Rudolph Thun
by Karlikhauer
Atty.

Nov. 7, 1933.    R. THUN    1,934,514
OPTICAL FILM COPYING MACHINE
Filed Nov. 12, 1930    2 Sheets-Sheet 2
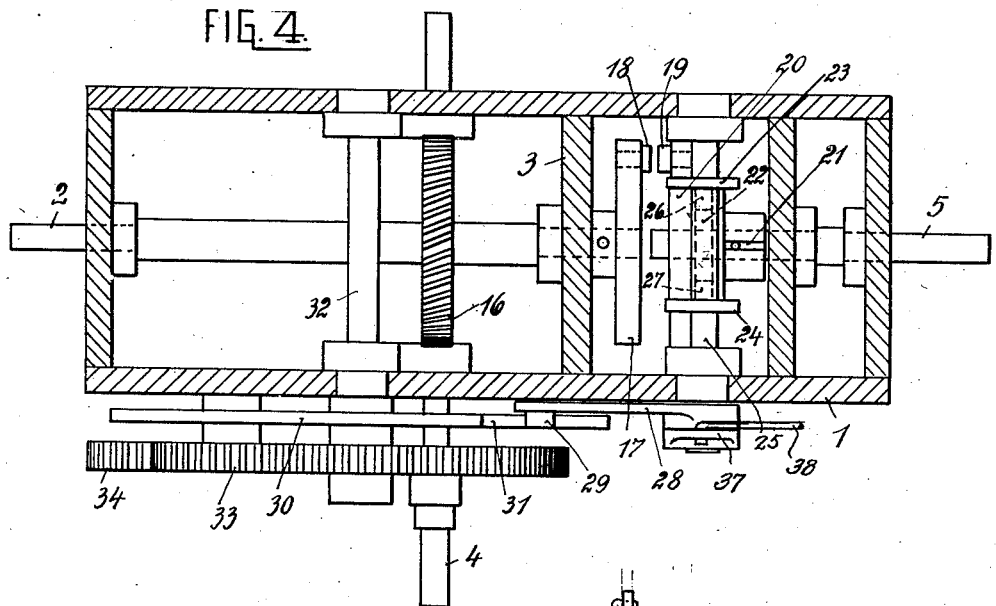
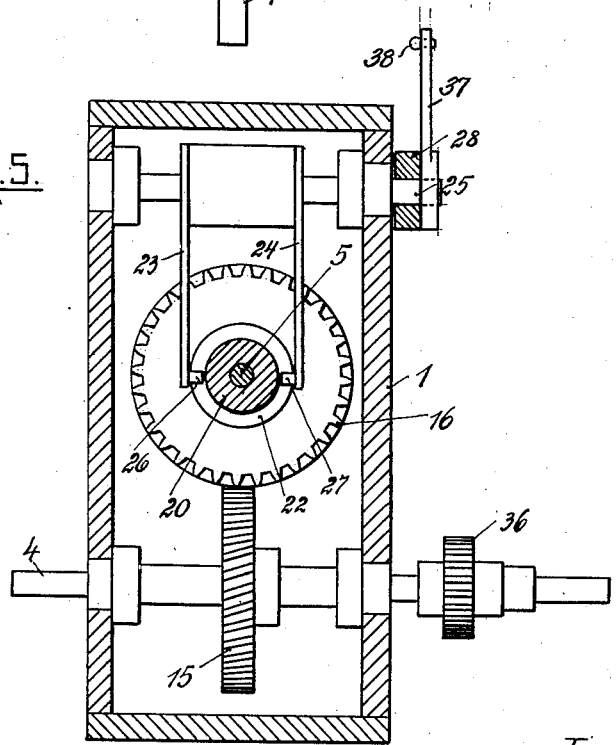
Inventor:
Rudolph Thun
by Karl Michaelis
Atty.

Patented Nov. 7, 1933

1,934,514

UNITED STATES PATENT OFFICE 1,934,514

OPTICAL FILM-COPYING MACHINE

Rudolph Thun, Schoneiche, Germany

Application November 12, 1930, Serial No. 495,125, and in Germany November 15, 1929

2 Claims. (Cl. 88—24)

My invention relates to an optical film-copying machine which is particularly suitable for copying talking picture films. More especially, it relates to a copying machine in which the pictures of the original (the negative film) are repeatedly copied, or skipped, at equal distances.

It is an object of my invention to provide an improved machine of the kind referred to.

To this end I so design my machine that the numbers of pictures on the original and on the copy are at a ratio to each other which cannot be expressed by an integer.

In the copying of moving-picture films as performed heretofore the copy normally has the same number of pictures per unit of time as the original. Frequently, however, it is found that another number of pictures per unit of time is required in the copy than in the original. My invention provides for effecting the desired number of picture changes in copying.

My machine is particularly useful in the manufacture of talking films in which it is not possible to alter the number of picture changes when the film is projected.

In my machine certain pictures of the original are skipped, or copied twice, at predetermined intervals. For instance, if the film was exposed at the rate of 18 pictures per sec. and 24 pictures per sec. are required in the copy, each third picture must be copied twice. In this case the action which is shown by 18 pictures in the original or negative film is reproduced in the copy or positive film at the ratio of ¾ x 18. Although in the copy the time intervals of the several pictures are not exactly equal, the impression in the eye is steady, as the variations are repeated six times per second.

For reducing the number of pictures in the negative film I may either skip certain pictures instead of copying them twice as described, or I may combine two or more pictures into a single picture by transferring each of the pictures to be combined to the copy at a time of exposure which is reduced at such a rate that the total time of exposure for all pictures to be combined is equal to the time of exposure of the pictures which are transferred to the copy only once.

According to my invention I may prepare a copy from a single negative or from a double negative.

In the drawings affixed to this specification and forming part thereof a machine embodying my invention is illustrated diagrammatically by way of example.

In the drawings:

Fig. 1 is a diagram illustrating the arrangement of the complete machine,

Fig. 2 is an end elevation of the feeding mechanism for the negative film, drawn to a larger scale, Fig. 3 is an elevation of the gear box of the machine, drawn to a larger scale, and Figs. 4 and 5 are sections on the corresponding lines in Fig. 3.

Referring now to the drawings, and first to Fig. 1, the gear box whose mechanism will be described in detail below, is equipped with a casing 1, and 6 is an electric motor or other suitable source of power for driving the machine. The principal driving shaft 4 which is directly connected to the motor 6, with a suitable reduction gear (not shown) if required, extends transversely through the gear box casing 1 and is rotated at uniform speed and in the same direction by the motor 6. The principal driving shaft 4 operates a subsidiary driving shaft 2 which extends longitudinally in, and projects from one end of, the gear box casing 1. This shaft rotates at the same speed as, but in opposite direction to, the principal driving shaft 4 and 5 is another subsidiary driving shaft which projects from the opposite end of the casing 1 in line with the longitudinal shaft 2. The subsidiary driving shaft 5 is adapted to be connected to the longitudinal shaft 2 so that, if connected, it rotates at the same speed and in the same direction as the longitudinal shaft 2. The mechanism 7 for feeding the original or negative film and the mechanism 8 for feeding the positive or copy film may be of any suitable kind and the parts in their casings will not be described. 9 is an objective on the positive feeding mechanism 8 and 41 is a shutter for cooperation with the objective 9. A driven shaft 12 projects from the negative mechanism 7, a driven shaft 10 projects from the positive mechanism 8, and 11, 13 and 14 are shafts for connecting the driven shafts to the subsidiary driving shafts, as will be described. Preferably, the shafts are flexible as shown so that the three units 1, 7 and 8 of the machine may be arranged in any suitable relative position.

If the mechanism in the gear box casing 1 were designed in the usual manner, i. e., for continuous and not for intermittent operation, the stopping periods would have to be so long as compared with the feeding periods, that all stopping periods overlap at least partly, and the shutter for regulating the exposure of the positive film must be so designed that it effects exposures only during the overlapping periods. The pitch of the exposure slits is regular only in the simplest case of copying twice all the pictures, or of skipping every second pictures, while in all other cases the pitch is irregular, although the same pitches are repeated in the cycle of the copied pictures, in the above example after every fourth picture. The pitches of the slits are found from a diagram of the stopping periods for both mechanisms 7 and 8. Where the periods overlap the width of the slits must be equal.

The arrangement referred to has the drawback that the exposure slits are comparatively narrow unless the switching periods are quite short. Narrow slits limit the output of the apparatus as with consideration of the character of the pictures, the intensity of the light cannot always be increased to the extent required. The feeding periods must not be reduced too much with consideration of the standing of the pictures.

These drawbacks are eliminated according to my invention by so designing the gearing in the casing 1 that it operates the two feeding mechanisms 7 and 8 at equal speed but that the drive of one of the mechanisms is cut out at predetermined intervals. If it is desired to reduce the number of the pictures on the positive film, the mechanism 8 is operated intermittently by connecting it to the subsidiary driving shaft 5 by the flexible connection 11. If the number of the pictures on the positive film is to be increased the mechanism 7 is connected to the same shaft 5. The other mechanism is operated continuously by connecting its driven shaft to the principal shaft 4 or to the longitudinal subsidiary driving shaft 2 which two shafts, it will be remembered, rotate at the same speed but in opposite directions. In the example illustrated the negative feeding mechanism 7 may be connected to the driving shaft 4 through the medium of the flexible connection 13 or to the shaft 2 through the medium of the flexible connection 14 indicated in dotted lines. When it is desired that the copy should move in the same direction as the original, the longitudinal shaft 2 is connected to the mechanism 7, and when it is desired that it should move in the opposite direction the principal driving shaft 4 is connected to the mechanism. It will be understood that the mechanism 7 or 8 which is connected to the subsidiary driving shaft 5, is operated intermittently and the mechanism 7 or 8 which is connected to the principal driving shaft 4 or to the longitudinal subsidiary driving shaft 2 is operated continuously in a direction corresponding to the rotation of the shaft to which it is connected at the time.

Referring now to Figs. 3-5, 15 is a helical wheel on the principal driving shaft 4, and 16 is a helical wheel on the longitudinal subsidiary shaft 2 at right angles to the shaft 4, the ratio of the wheels being 1:1 so that the longitudinal shaft 2 rotates at the same speed as the transverse shaft 4. The other subsidiary driving shaft 5 extends in line with the longitudinal shaft 2, 17 is a clutch member on the inner end of the shaft 2 which is supported in a bearing of a transverse stay 3 of the casing 1, 18 are clutching pins on the member 17, and 19 are pins on the mating member 20 on the shaft 5. The member 17 is fixed on the shaft 2 while the member 20 is mounted to slide on the shaft 5 but is prevented from relative rotation by a spline 21. 22 is a flanged ring on the member 20; 23, 24 are arms which are secured on a transverse shaft 25 in casing 1 and 26, 27 are pins at the lower ends of the respective arms for engaging the ring 22.

Mounted on the end of the shaft 25 which projects from the gear casing 1 is an arm 28, and 29 is a pin at its free end. 30 is a cam plate with a notch 31 for cooperation with the pin 29, the cam plate being secured on the outer end of a transverse shaft 32 in the gear casing 1. Any suitable means, not shown, such as a spring, may be provided for holding the pin 29 engaged with the edge of the cam plate 30. 33 is a spur gear which is also secured on the shaft 32 at the side of the cam plate 30, 34 is a spur gear which is mounted to rotate on a short pin 35 on the outside of the casing, and 36 is a pinion on the end of the shaft 4 which projects from the casing 1 at the side opposite the motor 6.

It will be understood that the rotation of the principal driving shaft 4 is transmitted to the longitudinal subsidiary driving shaft 2 at the ratio 1 by 1 through the helical gears 15 and 16, while at the same time the shaft 32, with the cam plate 33, is rotated at a speed which corresponds to the ratio of the pinion 36 and the spur gears 33, 34. The gears and the pinion may be exchangeable so that the notch 31 will register with the pin 29 at every second, third, fourth, etc. revolution of the driving shaft 4, and consequently of the longitudinal shaft 2. The ratios must be integers. The shaft 5 is then uncoupled from the shaft 2 for a complete revolution.

If the copy is only to be lengthened or shortened a similar gear may be built into one of the feeding mechanisms 7, 8. If one of the mechanisms includes a claw a cam plate with several cams may be provided for effecting engagement of the claw pins, the cams corresponding to the skipping being omitted.

The connection between the feeding mechanism 8 for the copy and the gear in the casing 1, must be so designed that when the clutch 17, 20 is thrown out the shutter of the mechanism is closed. This may be effected by any suitable automatic means. In the example illustrated, 37 is a lever which is secured on the outer end of the shaft 25 at the side of the lever 28. 38 is a Bowden cable which is connected to the free end of lever 37 and threaded through an eye in a suitable guide 39 on the top plate of the casing 1. 40 is a roller or other suitable guiding means on the casing of the copy-feeding mechanism 8 which supports the Bowden cable 38, whose other end is deflected at right angles and connected to the shutter 41. The shutter is fulcrumed at 42 and is so arranged that in its open position it bears on a pin 42 by gravity or under the action of a spring (not shown). When the pin 29 at the end of the arm 28 engages in the notch 31, as shown in Fig. 3, the clutch is thrown out as described and at the same time the lever 37 moves to the left, pulling the cable 38 and raising the shutter 41 into its closing position, as shown in Fig. 2. When the feeding mechanism 7 for the original is connected to the shaft 5, the film must be arrested when the clutch is thrown out.

The above rule may be departed from by providing an additional shutter which is so operated by the clutching lever 28 as to be closed when the pin 29 registers with a notch 31. The additional shutter must be opened from the shaft 5 by a mechanism similar to the fire-guard flaps in projecting apparatus.

Other connections than the flexible shafts 11, 13 and 14 may be provided, but flexible shafts are preferred on account of their simplicity.

I wish it to be understood that I do not desire to be limited to the exact details of construction shown and described, for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. An optical film-copying machine comprising a source of power, gearing operatively connected to said source of power, a mechanism for feeding a negative film, mechanism for feeding a positive film, a continuously rotating shaft in said gearing, an intermittently rotating shaft, a clutch intermediate said shafts, means operatively connected to said gearing for throwing out said clutch at predetermined intervals, and means for alternately connecting said continuously rotating shaft to one of said mechanisms, and said intermittently rotating shaft to the other mechanism.

2. An optical film-copying machine comprising a source of power, gearing operatively connected to said source of power, a mechanism for feeding a negative film, mechanism for feeding a positive film, a continuously rotating shaft in said gearing, an intermittently rotating shaft, a clutch intermediate said shafts, means operatively connected to said gearing for throwing out said clutch at predetermined intervals, means for alternately connecting said continuously rotating shaft to one of said mechanisms, and said intermittently rotating shaft to the other mechanism, and a shutter on said copy-feeding mechanism which is operatively connected to said clutch so as to be closed when said clutch is thrown out and to be opened when said clutch is thrown in.

RUDOLPH THUN.